(12) United States Patent
Vogt et al.

(10) Patent No.: US 9,073,020 B2
(45) Date of Patent: Jul. 7, 2015

(54) SYNCHRONISED DISPENSING DEVICE, METHOD FOR SYNCHRONISING FLOWS, AND METHOD FOR MIXING A MIXABLE MATERIAL

(75) Inventors: Sebastian Vogt, Erfurt (DE); Hubert Buechner, Nuremberg (DE)

(73) Assignee: Heraeus Medical GmbH, Wehrheim (DE)

( * ) Notice: Subject to any disclaimer, the term of this patent is extended or adjusted under 35 U.S.C. 154(b) by 0 days.

(21) Appl. No.: 13/823,340

(22) PCT Filed: Aug. 10, 2011

(86) PCT No.: PCT/EP2011/003995
§ 371 (c)(1),
(2), (4) Date: Mar. 14, 2013

(87) PCT Pub. No.: WO2012/038005
PCT Pub. Date: Mar. 29, 2012

(65) Prior Publication Data
US 2013/0175290 A1    Jul. 11, 2013

(30) Foreign Application Priority Data

Sep. 22, 2010  (DE) .......................... 10 2010 046 054

(51) Int. Cl.
*B01F 3/08*      (2006.01)
*B01F 15/00*    (2006.01)
(Continued)

(52) U.S. Cl.
CPC .............. *B01F 3/08* (2013.01); *B01F 5/0602* (2013.01); *B01F 15/0087* (2013.01);
(Continued)

(58) Field of Classification Search
USPC ........... 222/386, 326, 389, 390, 145.5, 145.6, 222/394, 399
See application file for complete search history.

(56) References Cited

U.S. PATENT DOCUMENTS 2,543,941 A * 3/1951 Sargent ........................... 169/15
3,420,180 A * 1/1969 Schmitt et al. .................. 418/15
(Continued)

FOREIGN PATENT DOCUMENTS

DE   1161140 B   1/1964
DE   8529804 U1  1/1986
(Continued)

OTHER PUBLICATIONS
International Search Report for PCT Application No. PCT/EP2011/003995 dated Jan. 9, 2012.
(Continued)

*Primary Examiner* — Donnell Long
(74) *Attorney, Agent, or Firm* — Norris McLaughlin & Marcus, P.A.

(57) ABSTRACT

A cartridge system for mixing and applying a mixable material has a discharge opening and at least two cartridges which have interiors delimited in some areas by a cartridge head. A device regulates streams from the cartridges, is arranged on the cartridge head and has an outflow opening and conveying mechanisms for conveying the starting components to the outflow opening. Each conveying mechanism has a connection to an interior of a cartridge, which has a cartridge opening, and is arranged rotatably in the device. Volumetric flows of the components are defined by the angular velocities of the conveying mechanisms, and the conveying mechanisms are coupled to each other in such a way that the ratio of the angular velocities relative to each other is fixed, such that a defined mixing ratio can be generated at the outflow opening.

27 Claims, 1 Drawing Sheet

(51) Int. Cl.
  *B01F 15/02* (2006.01)
  *B01F 15/04* (2006.01)
  *B05C 17/005* (2006.01)
  *B01F 5/06* (2006.01)
  *B05C 17/015* (2006.01)

(52) U.S. Cl.
  CPC ........ *B01F 15/0226* (2013.01); *B01F 15/0243* (2013.01); *B01F 15/0416* (2013.01); *B01F 2215/0029* (2013.01); *B05C 17/00556* (2013.01); *B05C 17/00566* (2013.01); *B05C 17/015* (2013.01)

(56) References Cited

U.S. PATENT DOCUMENTS

| | | | | |
|---|---|---|---|---|
| 3,549,048 | A * | 12/1970 | Goodman | 222/57 |
| 3,575,535 | A * | 4/1971 | Bickar | 417/244 |
| 4,090,262 | A | 5/1978 | Schneider et al. | |
| 4,260,077 | A | 4/1981 | Schroeder | |
| 4,631,009 | A * | 12/1986 | Cygnor et al. | 418/15 |
| 4,790,454 | A * | 12/1988 | Clark et al. | 222/136 |
| 5,558,116 | A | 9/1996 | Dubach | |
| 6,315,166 | B1 * | 11/2001 | Beck et al. | 222/137 |
| 6,386,396 | B1 * | 5/2002 | Strecker | 222/261 |
| 6,820,766 | B2 * | 11/2004 | Keller et al. | 222/137 |
| 7,395,948 | B2 * | 7/2008 | Kogan | 222/136 |
| 7,748,567 | B2 * | 7/2010 | Horner et al. | 222/135 |
| 8,099,957 | B2 * | 1/2012 | Boyer et al. | 60/612 |
| 2003/0080152 | A1 * | 5/2003 | Balcome et al. | 222/136 |
| 2007/0164047 | A1 * | 7/2007 | Reidt et al. | 222/137 |
| 2009/0105366 | A1 | 4/2009 | Vogt et al. | |
| 2009/0140007 | A1 * | 6/2009 | Voss | 222/135 |
| 2009/0207686 | A1 | 8/2009 | Faccioli et al. | |
| 2011/0114668 | A1 * | 5/2011 | Bublewitz et al. | 222/41 |

FOREIGN PATENT DOCUMENTS

| | | |
|---|---|---|
| DE | 102007050762 B3 | 5/2009 |
| EP | 0633056 A1 | 1/1995 |
| GB | 1491177 A | 11/1977 |
| JP | S54105361 A | 8/1979 |
| JP | H06261932 A | 9/1994 |
| JP | H09271654 A | 10/1997 |
| JP | 2000271130 A | 10/2000 |
| JP | 2001510089 A | 7/2001 |
| JP | 2001219045 A | 8/2001 |
| JP | 2005205407 A | 8/2005 |
| JP | 2007275888 A | 10/2007 |
| JP | 2008546497 A | 12/2008 |
| JP | 2010022421 A | 2/2010 |
| WO | 9524556 A1 | 9/1995 |
| WO | 97/28834 A1 | 8/1997 |
| WO | 2006071136 A1 | 7/2006 |
| WO | 2007000631 A1 | 1/2007 |
| WO | 2010/082966 A1 | 7/2010 |

OTHER PUBLICATIONS

Australian Examination Report for corresponding Australian Patent Application No. 2011304763 dated Mar. 28, 2014.

Japanese Office Action for corresponding Japanese Patent Application No. 2013-529559 dated Apr. 1, 2014.

Japanese Office Action, with English-language translation, for corresponding Japanese Patent Application No. 2013-529559 dated Feb. 3, 2015.

Chinese Office Action, with English-language translation, for corresponding Chinese Patent Application No. 201180045449.4 dated Sep. 3, 2014.

* cited by examiner

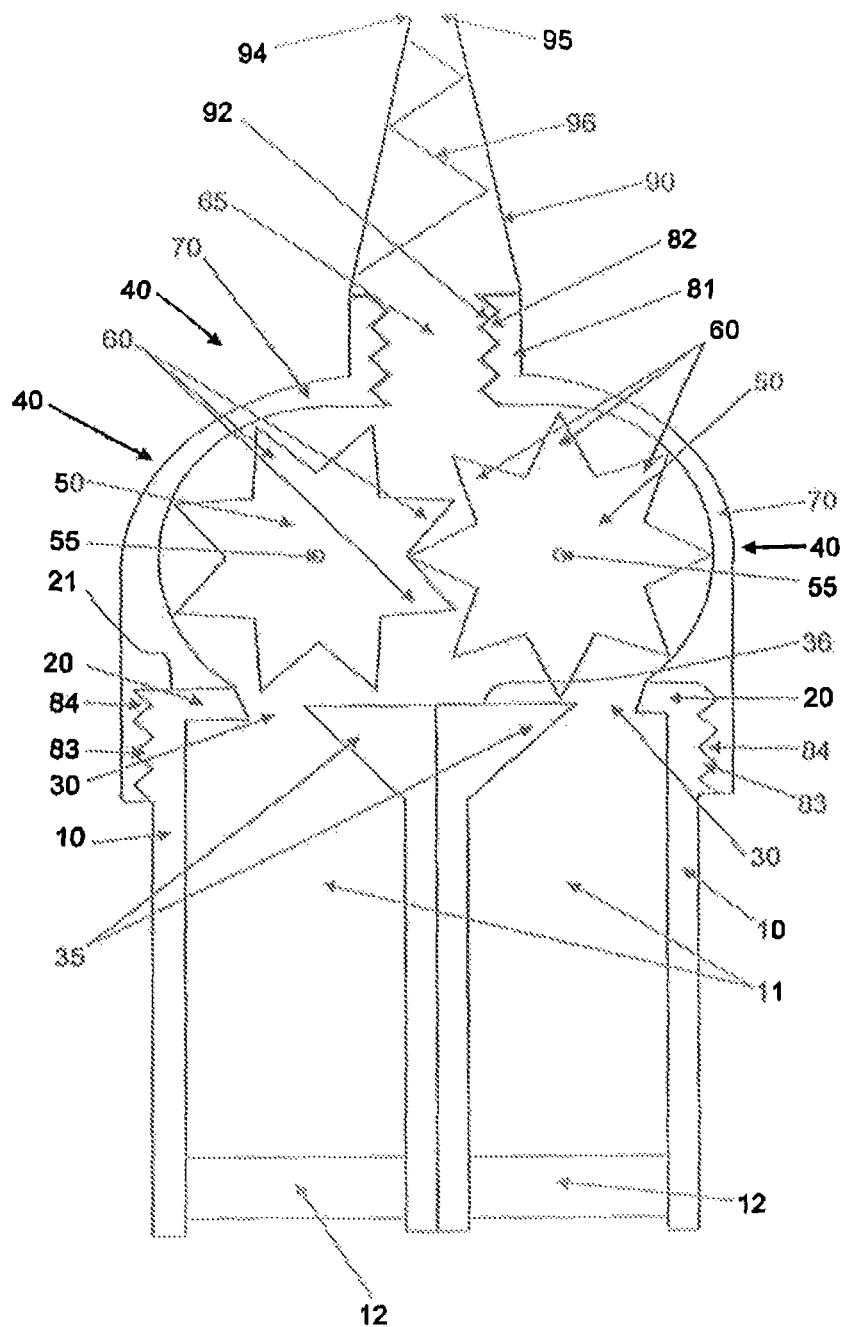

SYNCHRONISED DISPENSING DEVICE, METHOD FOR SYNCHRONISING FLOWS, AND METHOD FOR MIXING A MIXABLE MATERIAL

This is a 371 of PCT/EP2011/003995 filed 10 Aug. 2011 (international filing date), and claims the priority of German Application No. 10 2010 046 054.0 filed 22 Sep. 2010.

The invention relates to a cartridge system for mixing and applying a mixable material, in particular of a medical cement, comprising a dispensing opening and at least two cartridges, whereby the cartridges comprise interior spaces regions of which are bordered through a cartridge head, whereby at least one cartridge opening each for expelling the cartridge contents from the cartridges is provided for each interior space.

The invention also relates to a method for synchronising flows of at least two starting components for a mixable material using a cartridge system of this type and method(s) for mixing a mixable material using a cartridge system of this type.

Accordingly, a device for synchronising fluid flows is also a subject matter of the invention. The device is intended, in particular, for two-component side-by-side cartridge systems. A method for synchronising fluid flows and the use of the device are also a subject matter of the invention.

An "ideal fluid" is understood, in particular, to mean a substance that poses no resistance to shearing at arbitrarily low velocity. Hereinafter, the term, "fluid", shall encompass mainly incompressible fluids. The term, "fluid flow", shall be understood to mean a moving flowing fluid.

Preferably, the term, "fluid", shall be understood to also mean flowable pastes. A paste is a solid-liquid mixture (suspension) having a high solids content.

Pasty two-component systems are very common in technology and are manufactured in large-scale production for seals and adhesives for use in industry, crafts, and home improvement. Pasty two-component systems are also common in dental technology. Recently, attempts have been made to develop pasty two-component polymethylmethacrylate bone cement systems, such as is known, for example, from DE 10 2007 050 762 B3. Currently, so-called side-by-side cartridges and coaxial cartridges are the customary technology.

All these two-component systems are based on the same basic principle, i.e. an initiator being present in one paste and an accelerator or curing agent being present in the other paste. The pastes are usually stored separately in separate cartridges. The pastes are pushed from said cartridges towards the cartridge head by means of feed plungers arranged therein and the action of pestles. In this context, it is important that the pastes are pressed at the predetermined volume ratio from the cartridges into static mixers which are arranged on each cartridge head. The pastes are mixed in the static mixers and the curing reaction commences. It is essential to the quality of the cured paste material to maintain the mutual volume ratio of the two pastes. Most often the volume ratio of the pastes is in the range of 1:1 to 1:10. The volume ratio is maintained not only through the dimensioning of the cartridges, but also through synchronous propulsion of the feed plungers in the cartridges. Referring to the technical means, said synchronous propulsion is affected by the two feed plungers being connected to each other. In most two components systems, the feed plungers are connected to a toothed rack that is moved towards the cartridge head either through manual force via actuating levers or through motors.

Moreover, it is also feasible to extrude from cartridges using compressed air. In this context, a feed plunger having two pestles on its outside is situated in the cartridge system. During extrusion, compressed air is applied to the feed plunger which is thus made to move towards the cartridge head. The pestles provided on the outside press on the plungers of the cartridges simultaneously. Since both pestles are connected to the feed plunger, they can move to the front towards the cartridge head only in synchronous manner.

It is important to synchronise the dispensing, since the viscosity of the pastes usually is not exactly the same. Accordingly, simply applying pressure from compressed air to non-synchronised plungers would only lead to the feed plunger of the lower viscosity paste being pressed more rapidly towards the cartridge head than the paste having the comparatively higher viscosity. This would change the predetermined volume ratio. This would result in less-than-optimally cured paste material.

Directly applying compressed gas from compressed gas conduits or conventional compressed gas cartridges, such as carbon dioxide cartridges, would be advantageous in that very large forces would act on the feed plungers, which would allow highly viscous pastes to be extruded as well, and in that the extrusion pressure, and thus the extrusion rate, could be controlled by means of simple valves without any need to have mechanical devices such as toothed racks or gears present.

It would be particularly advantageous for applications in the OR to be able to use compressed gas with a cartridge system/an applicator with the smallest possible volume and maximal extrusion force enabling rapid and safe application of pasty two-component polymethylmethacrylate bone cements. For this purpose, it would make sense to have the gas pressure act directly on the feed plungers in the cartridges without any need to have a large-volume synchronisation in the form of feed plungers with pestles.

A generic cartridge system having two cartridges and two feed plungers that are connected to each other is known from U.S. Pat. No. 4,260,077 A. The cartridge system is basically designed like two syringes being positioned right next to each other. A common outlet opening for both cartridge contents is provided on the tip of the cartridge system. Extruding the contents, the feed plungers are pressed into the cartridges until the front ends of the feed plungers touch against the cartridge heads.

DE 85 29 804 U1 discloses a device for dosing and mixing two different masses that are pasty or possess low to higher viscosity. Said masses are conveyed into a mixing chamber using two screw conveyors that are provided with fins working in opposite directions, whereby the screw conveyors are driven by means of a common drive shaft.

In summary, the basic disadvantage of previously known cartridge systems and/or applicator systems for pasty multi-component systems is that the feed plungers and/or pestles that are required for synchronisation of the dispensation of paste and are connected to each other cause the space needs of the applicators to be large since the connected feed plungers need to be at least as long as the cartridges in order to enable near complete dispensation of the pastes from the cartridges by means of moving the feed plungers towards the cartridge head. The feed plungers need to be moved all the way to the cartridge head in order to be able to press all paste contained in the cartridge volume into the static mixer.

Accordingly, it is the object of the invention to develop a device for synchronising and mixing pasty fluids that have the most compact design possible and still allow the dispensation of pastes to be synchronised such that starting components differing in viscosity can be pressed from the cartridges, for example into a static mixer, at a predetermined volume ratio by simply applying compressed gas to the feed plungers in the cartridges. It would also be advantageous for the device to be more compact than the cartridges. Another object of the invention relates to providing a method that overcomes the disadvantages of the prior art. The object of the invention is met in that a device for regulating flows of starting components from the cartridges is arranged on the cartridge head, comprising an outflow opening and at least two conveying facilities for conveying the starting components to the outflow opening, whereby each conveying facility possesses a connection to an interior space of a cartridge that comprises at least one cartridge opening, the conveying facilities are arranged in the device such as to be rotatable, whereby the volumetric flows of the starting components are determined through the angular velocities of the conveying facilities, and the conveying facilities are coupled to each other in suitable manner for the ratio of the angular velocities of the conveying facilities with respect to each other to be defined or definable such that a certain mixing ratio of the starting components can be generated at the outflow opening, whereby at least one of the conveying facilities can be driven by means of at least one flow of the starting components from the cartridge openings.

If no further facility, such as a dispensing tube or a static mixer, is arranged at the outflow opening, the outflow opening simultaneously is the dispensing opening in the scope of the invention. Accordingly, the outflow opening can be the dispensing opening of the cartridge system.

Coupling of the conveying facilities can be attained by means of gears, toothed belts, V-belts or even through magnetic coupling of the rotatable conveying facilities.

A definable ratio of the starting components to be mixed can be established, for example, by means of switchable or adjustable gears. Various transmissions can be set up by means of gear wheels and/or V-belts. However, in the simplest case, just one certain ratio is established by means of two gear wheels and/or toothed rollers whose cogs engage each other directly.

It is conceivable just as well that the mixing ratio of the starting components at the outflow opening can be adjusted by the coupling being adjustable. For this purpose, a toggle switch or a rotary knob can be arranged on the device by means of which the coupling can be adjusted.

The invention can provide the device for regulating flows of starting components from the cartridges to comprise a closed housing that provides at least two fluid connections between the cartridge openings and the outflow opening, whereby the conveying facilities are arranged in the fluid connections, in particular in different fluid connections, such that the starting components can be conveyed to the outflow opening by means of rotating conveying facilities.

In this context, the invention can provide the device to close tightly, in particular fluid-tightly, against the cartridge head such that at least two cartridge openings are connected in fluid-tight manner to the outflow opening and fluid-tight connections from the interior space of the cartridges to the outflow opening, preferably to the dispensing opening, are thus formed.

Moreover, the invention can provide the conveying facilities, in particular the cogs of the gear wheels and/or toothed rollers, to close tightly against the internal walls of the housing in this context.

Advantageous cartridge systems can also be characterised in that the conveying facilities are gear wheels and/or toothed rollers, preferably involute gear wheels and/or involute toothed rollers.

It is particular advantageous for the cogs of the gear wheels or toothed rollers to engage each other in such manner that a material situated between the cogs is squeezed out of the intervening spaces when the cogs engage each other. For this purpose, the gear wheels or toothed rollers can be designed suitably and arranged with respect to each other suitably for an involute gear to be generated. The distance between the cogs and the shape of said intervening spaces determine the quantity of material that is carried along during each revolution. Accordingly, the mixing ratio of the starting components that can be generated can be adjusted not only by means of the circumference of the gear wheels and/or toothed rollers and the number of cogs situated thereon, but also, according to the invention, through the size and shape of the intervening spaces of the cogs.

Accordingly, the invention can provide the volume of the intervening spaces of the cogs of a first gear wheel or a first toothed roller to be large as compared to the intervening spaces of the cogs of a second gear wheel or a second toothed roller.

Advantageous cartridge system having gear wheels or toothed rollers as conveying systems can also be characterised in that the starting components can be conveyed in intervening spaces between the cogs of the gear wheels and/or of the toothed rollers.

The invention can just as well provide the cogs of the gear wheels and/or toothed rollers to engage each other and thus to be coupled to each other, whereby the coupling preferably is implemented through involute gearing of the cogs.

It is particularly advantageous for the cartridges to be cylindrical side-by-side cartridges, in which the cartridges are arranged next to each other, in particular parallel to each other.

The invention can provide the cartridges to be bordered, on the sides opposite from the cartridge head, through one feed plunger each for expelling the starting components of the mixable material from the cartridges, whereby the feed plungers are arranged such as to be mobile in the interior space of the cartridges and in that the flows of the starting components out of the cartridges can preferably be driven through a force acting on the feed plungers from outside.

The invention can just as well provide the interior spaces of the cartridge to be bordered on the side by walls, in particular through cylinder walls, preferably through cylinder walls with a circular cross-section, whereby the cartridge head closes tightly against the walls.

An advantageous refinement of the invention provides fastening means, in particular a thread for a dispensing tube, to be attached on the outflow opening.

Moreover, the invention can provide a dispensing tube comprising a static mixer and the dispensing opening to be arranged at the outflow opening.

A particularly simple implementation of the invention provides at least one of the conveying facilities to be drivable through at least one flow of the starting components from the cartridge openings.

For this purpose, it can be especially advantageous to have at least one deflector arranged in the region of the cartridge openings, which deflector can guide at least one of the flows from the cartridges onto a region of the conveying facility, and the direction of rotation of the conveying facilities thus to be defined.

In this context, the invention can provide the deflector to form a deflector surface on the outside of the cartridge head that is larger than the surface parallel to the deflector surface formed between the axes of rotation of the conveying facilities, and the deflector surface to completely cover the surface between the axes of rotation of the conveying facilities in the direction perpendicular to the cartridge head.

The invention is particularly easy to implement if the invention provides the cartridge system to comprise two cartridges and two conveying facilities, in particular two gear wheels or two toothed rollers, whereby the axes of rotation of the gear wheels and/or toothed rollers are arranged to be parallel to each other, or the cartridge system to comprise four cartridges and four conveying facilities.

Moreover, the invention can provide the axes of rotation of the conveying facilities to be arranged to be parallel to the surface of the cartridge head.

In terms of the method, the object of the invention is met in that at least two starting components are squeezed from the at least two cartridges through the cartridge openings;

the starting components are squeezed into the conveying facilities;

the conveying facilities are driven through the flows of the starting components;

the flow, in particular the volumetric flow, of the conveyed starting components to the outflow opening is determined through the angular velocity of the conveying facilities, in that the coupling of the conveying facilities transmits a force from at least one conveying facility to at least one other conveying facility; and the coupling is adjusted suitably such that certain mixing ratios of the starting components at the outflow opening are attained.

In this context, the invention can provide the flows to be mixed in the region of the outflow opening and/or between the outflow opening and the dispensing opening, preferably through the use of a static mixer.

The invention can just as well provide gear wheels and/or toothed rollers to be used as conveying facilities, whereby the starting components are transported in the intervening spaces between the cogs of the gear wheels and/or toothed rollers.

In this context, the invention can provide the coupling of the gear wheels and/or toothed rollers to be generated through mutual engagement of the cogs of the gear wheels and/or toothed rollers, whereby, in particular, involute gearing of the gear wheels and/or toothed rollers is used.

The invention can just as well provide that engagement of the cogs of the gear wheels and/or toothed rollers is associated with the starting components, which are being carried along, being squeezed out, at least partially, between the cogs.

Methods according to the invention can also be characterised in that two starting components from two cartridges are mixed, whereby two conveying facilities are used.

And lastly, the object of the invention is also met through a method for mixing a mixable material using a cartridge system of this type, whereby the cartridge system is used for mixing flowing pasty adhesives, pasty sealants, pasty food items, pasty dental materials, pasty inorganic bone cements and/or pasty polymethylmethacrylate bone cements, in particular through the use of a method according to the invention.

The invention is based on the surprising finding that simple coupling of rotatable conveying facilities allows the ratio of the angular velocities of the conveying facilities with respect to each other to be set and thus a certain mixing ratio of the starting components to be set. If the flows, i.e. including the mass flows and/or the volumetric flows, of the starting components from the cartridges are determined through the angular velocities of the conveying facilities, the mixing ratio of the starting components and thus of the mixable material is also determined through the coupling.

If the material properties of the starting components differ, such as different viscosity, this will lead to the volumetric flows through the cartridge openings being different as well. This exerts different forces on the conveying facilities by means of which the flows are driven. Since the conveying facilities are coupled, the conveying facility experiencing the stronger force drives the conveying facilities or the conveying facility experiencing the lesser force or lesser forces. This slows down the stronger flows and enhances the weaker flows. Due to the coupling being fixed, the angular velocities of the rotatable conveying facilities are therefore defined and the desired mixture is generated at all times. The desired mixing ratio is thus established rapidly. Provided the geometry and frictional losses of the device are adapted appropriately, the cartridge system according to the invention and the methods according to the invention can therefore be used to easily attain an unchanged mixing ratio independent of the viscosity of the two fluids.

Cartridge systems and methods according to the invention can be used for synchronising and mixing flowing pasty adhesives, pasty sealants, pasty food items, pasty dental materials, pasty inorganic bone cements, and pasty polymethylmethacrylate bone cements.

The scope of the invention also includes providing a set of devices having different conveying facilities and/or different couplings for a cartridge system according to the invention that can be used to set different predetermined mixing ratios of fluids, in particular of medical cements, in two or more cartridges. The rotatable conveying facilities provide the basis for the cartridge systems according to the invention to be compact and simple in design. There is no need to assemble the conveying facilities from expensive materials, in particular when the cartridge system is for single use only. This is advantageous especially in the field of medicine, for example in cartridge systems for bone cements, since re-used cartridge systems need to be sterilised in a resource-consuming procedure.

The invention can therefore provide the conveying facility and/or the housing to be parts made of plastic material.

Exemplary embodiments of the invention shall be illustrated in the following on the basis of one schematic FIGURE, though without limiting the scope of the invention. In the Figures:

FIG. 1: shows a schematic cross-sectional view of a cartridge system according to the invention.

FIG. 1 shows a schematic cross-sectional view of a cartridge system according to the invention. The cartridge system comprises two cylindrical cartridges (10) which each comprise an interior space (11) containing the starting components to be mixed (in this case: pastes, in particular medical cements). The cartridges (10) have two cylindrical feed plungers (12) arranged on their floor-side which, together with the interior walls of the cartridges (10), close the interior spaces (11) tightly. The feed plungers (12) are arranged such that they can be shifted in the direction of the cylinder axes of the cartridges (10).

On the side of the cartridges (10) opposite from the feed plungers (12), both cartridges are closed (20) through a cartridge head (20). The cartridge head (20) is bordered on its upper side through a cartridge head external surface (21). Two cartridge openings (30) are situated in the cartridge head (20), of which one each opens one of the interior spaces (11) of the cartridges (10) on the head side. Applying a gas pressure (for example compressed air or the gas from a CO2 cartridge) to the bottom-side of the feed plungers (12) propels the feed plungers (12) in the direction of the cartridge head (20). This causes the content of the cartridges (10) to be extruded through the cartridge openings (30). A wedge-shaped deflector (35) is arranged on the cartridge head (20) in the middle between the two cartridge openings (30). The deflector (35) presses the starting components, which are squeezed from the cartridges (10), in certain directions. The deflector (35) has a deflector surface (36) that forms a part of the outer surface (21) of the cartridge head.

A device (40) for regulating flows of starting components (not shown) from the cartridges (10) is arranged above the cartridge head (20). Two gear wheels (50) are arranged above the cartridge openings (30) in the device. The gear wheels (50) are supported like in a bearing in the device (40) such that they can rotate about axes of rotation (55). The gear wheels (50) are supported like in a bearing such that the cogs (60) of the gear wheels (50) engage each other and are thus coupled to each other. It is particularly preferred for the gear wheels (50) to form an involute gear, since this not only renders the transmission of the force of the gear wheels (50) steady and even, but also allows the starting components, which are being conveyed, i.e. transported, between the cogs (60) and/ or in the intervening spaces between cogs, to be squeezed and/or pressed out of said intervening spaces between cogs in particularly effective manner. The deflector (35) ensures that the flows from the cartridges (10) are directed onto the external regions of the gear wheels (50). This rotates the left gear wheel (50) in clockwise direction and the right gear wheel (50) in counter-clockwise direction. For this purpose, the width of the deflector surface (36) is larger than the distance of the axes (55) from each other.

An outflow opening (65) for the mixed mixable material, or the mixed fluids, as it may be, is provided on the upper side of the device (40). In order to form a tight connection from the cartridge openings (30) to the outflow opening (65), the device (40) comprises a housing (70). The gear wheels (50) are arranged in the connections thus formed. The cogs (60) of the gear wheels (50) move tightly against the internal walls of the housing (70) such that the amount of the starting components that can squeeze past the cogs (60) through the connection to the outflow opening is minimised. Preferably, the tips of the cogs (60) close tightly against the internal walls of the housing. For this purpose, the gear wheels (50), and/or the edges of the cogs (60) as it may be, can consist of a flexible material, such as, for example, a hard rubber or a softer plastic material.

The outflow opening (65) is arranged in a cylindrical connector (81) having a circular footprint. Fastening means (82) in the form of an internal thread are provided on the inside of the connector (81).

Second fastening means (83), for example snap-in locking means or an internal thread, can be arranged on the bottom side of the device (40). The fastening means (83) can be used to fasten the device (40) to the cartridges (10). For this purpose, the cartridges (10) comprise third fastening means (84), for example counter snap-in locking means or an external thread, that engage the fastening means (83) of the device (40). What this achieves is that various devices with different conveying facilities for generating different mixing ratios can be attached to the cartridges.

The purpose of the internal thread (82) of the connector (81) is to attach a dispensing tube (90) comprising an external thread (92) to it. Instead of an internal thread (82) and an external thread (92), the dispensing tube (90) can just as well be attached to the dispensing opening (65) through other fastening means.

Conceivable for this purpose are, in particular, snap-in means, catches, bayonet closures, adhesive closures, Velcro® fasteners, and simple plug-in connections that are easy to assemble, but more complex fastening means, such as flanges, are conceivable as well. The dispensing tube (90) can just as well be fixedly connected to the connector (81), for example as a single part. A dispensing tube tip (94) is arranged on the upper tip of the dispensing tube (90) and can be used to apply the mixable material. A dispensing opening (95) through which a mixed mixable material can be applied is provided at the dispensing tube tip (94). To provide for better mixing of the fluids, a static mixer (96) is arranged in the dispensing tube (90).

The openings for the mixable material formed in the dispensing tube (90) and the dispensing opening (65) are preferably larger than the cross-sections of the intervening spaces formed through the cogs (60) of the gear wheels (50). This is to make sure that the largest resistance to the flow of the fluids is generated at the cogs (60) of the gear wheels (50) and not to reduce the effect thereof through back pressure.

A method according to the invention can be illustrated, for example, as follows based on the exemplary embodiment shown:

A pressure is applied to the feed plungers (12), for example through applying a gas pressure. The feed plungers (12) move in the direction of the cartridge head (20) and thus press the contents of the cartridges (10), i.e. the starting components of the mixable material to be mixed, through the cartridge openings (30) into the device (40). If the flowability of the starting components differs, the same force acting on the two feed plungers (12) initially leads to different propulsion of the feed plungers (12) and thus to different volumetric flows of the starting components from the cartridges (10) through the cartridge openings (30).

The deflector (35) directs the flows onto the external regions of the gear wheels (50) such that the left gear wheel (50) is rotated in clockwise direction and the right gear wheel (50) is rotated in counter-clockwise direction. The starting components are guided into the intervening spaces between the cogs (60) and are conveyed in the direction of the outlet opening (65) out of the device (40) through the rotation of the gear wheels (50). The different volumetric flows, i.e. the different volumes of the starting components that are pressed into the conveying facilities (50) per unit of time, drives, i.e. rotates, the two conveying facilities (50) to a different degree. Each revolution of the conveying facilities (50), i.e. of the gear wheels (50), transports a certain amount of the starting components to the outflow opening. Since the distances and sizes of the intervening spaces between the cogs (60) of the two gear wheels (50) are equal, each revolution conveys the same volume of the starting components.

However, since the cogs (60) of the conveying facility (50) engage each other, these can rotate only at the same speed such as to exclude that a less viscous starting component is conveyed more rapidly than a more viscous starting component. Accordingly, the volumetric flows cannot become set to be different, since the stronger volumetric flow is being slowed and the slower volumetric flow is being enhanced by means of the coupling.

Coupling the gear wheels (50) through their cogs (60) engaging each other thus ensures that only a fixed predetermined mixing ratio of the starting components is being generated. The energy for propelling the starting components and for rotating the conveying facilities (50) is taken from the pressure on the feed plungers (12). For this purpose, the starting components transmit the force to the conveying facilities (50).

The mixture thus generated is then pressed through the outflow opening (65) into the dispensing tube (90) where it is mixed using a static mixer (96) in order to attain improved mixing of the starting components. The requisite energy also needs to be derived from the pressure on the feed plungers (12). After sufficient mixing, the mixable material thus produced can be applied through the dispensing opening (95) at the dispensing tube tip (94).

Different mixing ratios of the two starting components can be attained through the intervening spaces between the cogs (60) having different volumes enclosed between the internal walls of the housing (70) and/or through the rotatable gear wheels (50) having different diameters.

The device (40) shown here is drawn schematically at a magnified scale only in order to keep the drawing comprehensible. Preferably, the invention is implementable through a device (40) that is much smaller as compared to the size of the cartridges (10) and as compared to the size of the dispensing tube (90). This prevents substantial dead volumes at the start of the mixing method and renders the entire device smaller and therefore more compact. The dispensing tube (90) can be screwed-on in the present case which enables an even more compact design and more compact storage of the entire cartridge system. A pivoting dispensing tube (90) could be provided just as well.

The features of the invention disclosed in the preceding description and in the claims, Figures, and exemplary embodiments, can be essential for the implementation of the various embodiments of the invention both alone and in any combination.

LIST OF REFERENCE NUMBERS

10 Cartridge
11 Interior space
12 Feed plunger
20 Cartridge head
21 External surface of the cartridge head
30 Cartridge opening
35 Deflector
36 Deflector surface
40 Device
50 Conveying facility/gear wheel
55 Axis
60 Gear wheel cog
65 Outflow opening
70 Housing
81 Connector
82, 83 Fastening means/internal thread
84 Fastening means/external thread
90 Dispensing tube
92 Fastening means/external thread
94 Dispensing tube tip
95 Dispensing opening
96 Static mixer

The invention claimed is:

1. A cartridge system, for mixing and applying a mixable material, comprising a dispensing opening and at least first and second cartridges, whereby the at least first and second cartridges comprise interior spaces, regions of which are bordered through a cartridge head, whereby the at least first and second cartridges are bordered, on the sides opposite from the cartridge head, through feed plungers, each feed plunger for expelling the starting components of the mixable material from each cartridge, whereby the feed plungers are arranged such as to be mobile in the interior space of the at least first and second cartridges, whereby at least one cartridge opening each for expelling the cartridge contents from each cartridge, is provided for each interior space of each cartridge, whereby a device, for regulating volumetric flows of starting components from the at least first and second cartridges, is arranged on the cartridge head bordering the interior spaces of the at least first and second cartridges, and comprises an outflow opening and at least first and second conveying facilities for conveying the starting components to the outflow opening, whereby the first conveying facility possesses a first connection to the interior space of the first cartridge via a first cartridge opening whereby the second conveying facility possesses a second connection to the interior space of the second cartridge via a second cartridge opening, wherein the at least first and second conveying facilities are arranged in the device such as to be rotatable, whereby the volumetric flows of the starting components are determined through angular velocities of the at least first and second conveying facilities, and the at least first and second conveying facilities are coupled to each other in suitable manner for a ratio of the angular velocities of the at least first and second conveying facilities with respect to each other to be defined or definable such that a mixing ratio of the starting components can be generated at the outflow opening, wherein the feed plungers are not connected to one another and are independently drivable and at least one of the at least first and second conveying facilities is drivable by means of at least one flow of the starting components from the first and second cartridge openings.

2. The cartridge system according to claim 1, wherein the device, for regulating flows of the components from the cartridges, comprises a closed housing that provides at least two fluid connections between the first and second cartridge openings and the outflow opening, whereby the at least first and second conveying facilities are arranged in the fluid connections such that the start components are conveyable to the outflow opening by means of rotating the at least first and second conveying facilities.

3. The cartridge system according to claim 2, wherein the at least first and second conveying facilities close against the internal walls of the closed housing.

4. The cartridge system according to claim 2, wherein the device closes fluid-tightly against the cartridge head such that the at least first and second cartridge openings are connected in fluid-tight manner to the outflow opening and fluid-tight connections from the interior space of the at least first and second cartridges to the outflow opening are formed.

5. The cartridge system according to claim 1, wherein the at least first and second conveying facilities are gear wheels or toothed rollers.

6. The cartridge system according to claim 4, wherein the starting components are conveyable between cogs of the gear wheels or toothed rollers.

7. The cartridge system according to claim 5, wherein cogs of the gear wheels or toothed rollers engage each other and thus are coupled to each other, whereby the coupling is implemented through involute gearing of the cogs.

8. The cartridge system according to claim 5, wherein a volume of intervening spaces of cogs of a first gear wheel or a first toothed roller is larger than a volume of intervening spaces of cogs of a second gear wheel or a second toothed roller.

9. The cartridge system according to claim 5, wherein the cartridge system consists of two cartridges and two conveying facilities or two toothed rollers, whereby axes of rotation of the gear wheels or toothed rollers are arranged to be parallel to each other, or in that the cartridge system comprises four cartridges and four conveying facilities.

10. The cartridge system according to claim 1, wherein the at least first and second cartridges are cylindrical side-by-side cartridges, in which the at least first and second cartridges are arranged next to each other.

11. The cartridge system according to claim 1, wherein in that the flows of the starting components out of the at least first and second cartridges are drivable through a force acting on the feed plungers from outside the cartridge system.

12. The cartridge system according to claim 1, wherein the interior spaces of the at least first and second cartridge are bordered on the side by walls with a circular cross-section, whereby the cartridge head closes tightly against the walls.

13. The cartridge system according to claim 1, wherein fastening means for a dispensing tube are arranged at the outflow opening.

14. The cartridge system according to claim 1, further comprising
a dispensing tube having a static mixer and the dispensing opening are arranged at the outflow opening.

15. The cartridge system according to claim 1, further comprising
at least one deflector arranged in a region of the first and second cartridge openings, wherein the at least one deflector is configured to guide at least one of the flows from at least one of the first and second cartridges onto a region of at least one of the first and second conveying facilities and in that a direction of rotation of the at least first and second conveying facilities is defined.

16. The cartridge system according to claim 15, wherein the deflector forms a deflector surface on the outside of the cartridge head that is larger than a distance between axes of rotation of the at least first and second conveying facilities, and in that the deflector surface completely covers a surface between the axes of rotation of the at least first and second conveying facilities in the direction perpendicular to the cartridge head.

17. The cartridge system according to claim 1, wherein axes of rotation of the at least first and second conveying facilities are arranged to be parallel to a surface of the cartridge head.

18. A method for synchronising flows of at least two starting components for a mixable material using the cartridge system according to claim 1, the method comprising:
squeezing at least two starting components from the at least first and second cartridges through the at least first and second cartridge openings, wherein the starting components are squeezed into the at least first and second conveying facilities, wherein the at least first and second conveying facilities are driven through the flows of the starting components, wherein a volumetric flow of the conveyed starting components to the outflow opening is determined through the angular velocity of the at least first and second conveying facilities, in that the coupling of the at least first and second conveying facilities transmits a force from the first conveying facility to the second conveying facility; and
adjusting the coupling such that the mixing ratios of the starting components at the outflow opening are attained.

19. The method according to claim 18, further comprising:
mixing the flows in a region of the outflow opening or between the outflow opening and the dispensing opening.

20. The method according to claim 18, wherein gear wheels or toothed rollers are used as the at least first and second conveying facilities, whereby the starting components are transported in the intervening spaces between the cogs of the gear wheels or toothed rollers.

21. The method according to claim 18, wherein the at least two components from the at least first and second cartridges are mixed, whereby the at least first and second conveying facilities are used.

22. The method according to claim 20, wherein the coupling of the gear wheels or toothed rollers is generated through mutual engagement of the cogs of the gear wheels or toothed rollers.

23. The method according to claim 20, wherein engagement of the cogs of the gear wheels or toothed rollers is associated with the starting components, which are being carried along, being squeezed out, at least partially, between the cogs.

24. A method, for mixing a mixable material, comprising:
mixing the mixable material with the cartridge system according to claim 1, wherein the mixable material is a flowing pasty adhesive, a pasty sealant, a pasty food item, a pasty dental material, a pasty inorganic bone cement or a pasty polymethylmethacrylate bone cement.

25. The cartridge system according to claim 1, wherein the device, for regulating volumetric flows of starting components from the at least first and second cartridges, directly contacts an outer surface of the cartridge head.

26. The cartridge system according to claim 1, further comprising:
a deflector arranged on the cartridge head between the at least first and second cartridge openings.

27. The cartridge system according to claim 26, wherein the deflector has a deflector surface that is substantially planar and extends from the first cartridge opening to the second cartridge opening.

* * * * *